Patented June 17, 1924.

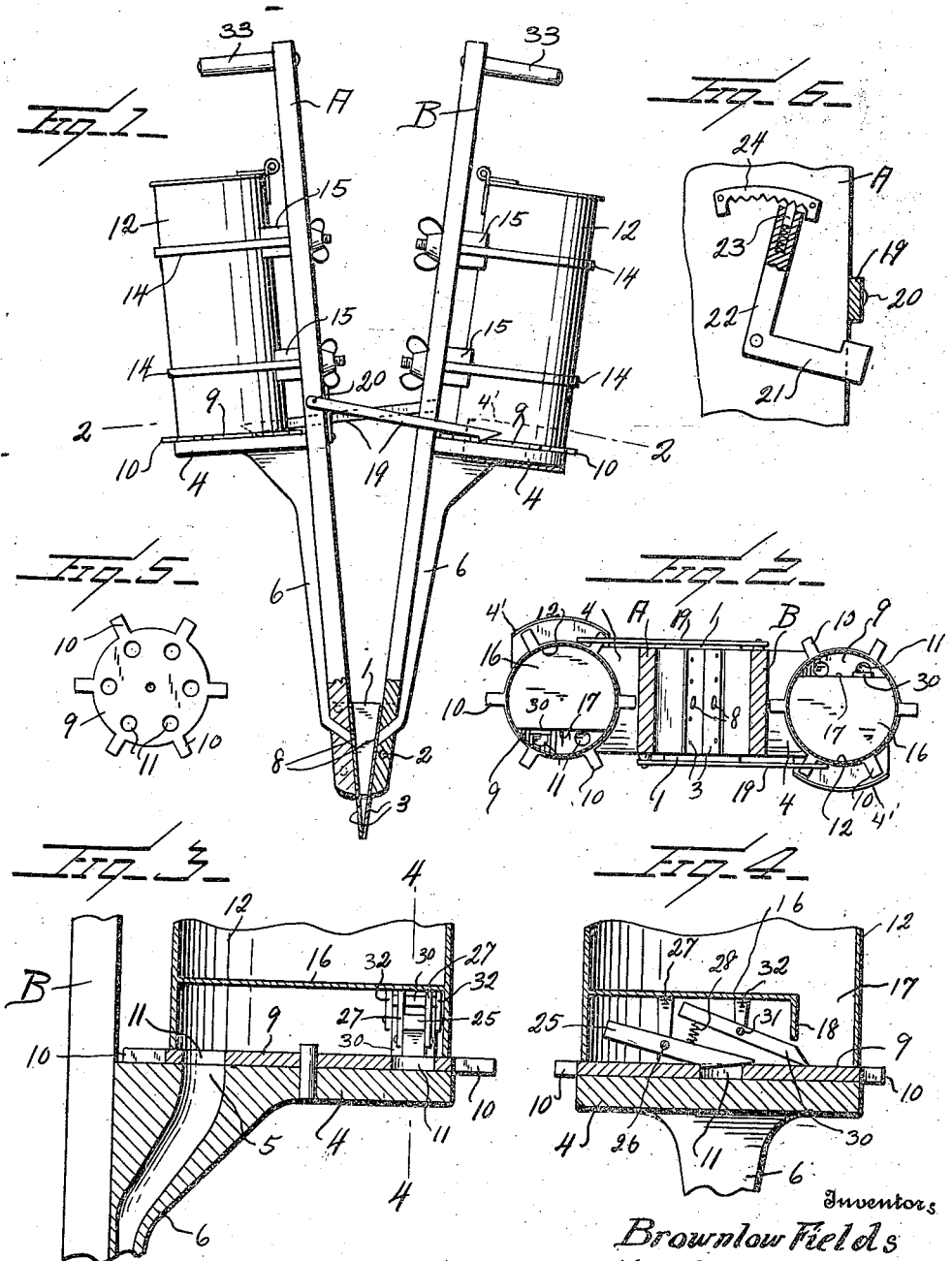

1,498,368

UNITED STATES PATENT OFFICE.

BROWNLOW FIELDS AND VAN BUREN FIELDS, OF LONDON, KENTUCKY.

PLANTING DEVICE.

Application filed June 28, 1922. Serial No. 571,406.

*To all whom it may concern:*

Be it known that BROWNLOW FIELDS and VAN BUREN FIELDS, citizens of the United States, residing at London, in the county of Laurel and State of Kentucky, have invented certain new and useful Improvements in Planting Devices, of which the following is a specification, reference being had to the accompanying drawings.

This invention relates to certain improvements in planting devices and has relation more particularly to a device of this general character which is manually operated and embodies a hopper discharge and it is an object of the invention to provide an implement of this general character embodying novel and improved means whereby the desired dropping of the seed may be readily obtained.

Another object of the invention is to provide a novel and improved implement of this general character comprising two elongated arms or levers connected for relative movement together with means operating upon relative movement of said levers or members to effect the desired delivery of the seed.

An additional object of the invention is to provide a novel and improved device of this general character comprising two elongated arms or levers connected for relative movement, each of said members being provided with a hopper provided with the requisite discharge, one of said hoppers being adapted to contain seed and the second of said hoppers being adapted to contain fertilizer together with means operating upon relative movement of the levers to effect a discharge of a predetermined quantity from each of the hoppers.

The invention consists in the details of construction and in the combination and arrangement of the several parts of our improved planting device whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in elevation with a portion broken away of a planting device constructed in accordance with an embodiment of our invention;

Figure 2 is a sectional view taken substantially on the line 2—2 of Figure 1;

Figure 3 is an enlarged fragmentary view partly in section and partly in elevation illustrating in detail a portion of a dropping mechanism as herein comprised.

Figure 4 is a fragmentary sectional view taken substantially on the line 4—4 of Figure 3;

Figure 5 is a view in plan of one of the feed or dropping plates as herein embodied unapplied; and Figure 6 is enlarged fragmentary view partly in elevation and partly in section illustrating the means herein embodied for rendering the feed or dropping means of a hopper inoperative.

As disclosed in the accompanying drawings, A and B denote two elongated members or levers having their adjacent or lower ends connected by the plates 1 and in a manner whereby the members or levers A and B may have relative swinging movement about the single connecting member or pin 2. The pivoted or connected end portions of the members A and B have secured to the opposed faces thereof the dibble plates 3 which extend below or beyond the adjacent ends of the levers or members A and B and which, during the work operation, are adapted to penetrate or impinge the soil to effect a desired opening to receive the seed.

Each of the levers or members A and B at a predetermined point intermediate the ends thereof is provided with an outstanding table or support 4 provided with a discharge opening 5. This opening 5 is continued through a conduit 6 which discharges, as at 8, between the dibble plates 3.

Rotatably mounted upon each of the tables or supports 4 is a feed or drop plate 9 provided with a series of outstanding fingers or arms 10 equidistantly spaced circumferentially of the plate 9. The peripheral portion of the plate 9 and in radial alinement with the fingers or arms 10 is provided with the discharge openings 11 adapted to register with the opening 5 in the table or support 4.

Positioned immediately above each of the plates 9 is a hopper 12 secured to the adjacent lever or member A or B by the clamping members 14, said hopper 12 and associated lever or member A and B having interposed therebetween the spacing blocks 15 so that the hopper 12 may be properly positioned with respect to the plate 9.

The lower end portion of the hopper 12 is provided with a horizontally or transversely disposed partition 16, said partition extending only partially across the hopper to provide an internal feed opening 17. The marginal portion of the partition 16 immediately adjacent to the opening 17 is defined by a depending flange 18 as is particularly illustrated in Figure 4. Co-acting with the fingers or arms 10 of each of the plates 9 is an elongated pawl 19, the pawl associated with one plate 9 being pivotally connected as at 20 to the member A or B remote from said plate 9. The pawl 19 engages by gravity and from above the fingers or arms 10 of its associated plate 9 so that upon separating movement of the members or levers A and B the plate 9 will be intermittently turned a distance sufficient to bring an opening 11 into register with the opening 5.

In practice the members A and B have their upper end portions initially separated as indicated in Figure 1 so that the free or outer extremities of the dibble plates 3 are substantially in contact. These dibble plates are then forced within the soil whereupon the upper end portions of the levers A and B are swung inwardly one toward the other. This action results in a separation of the plates 3 to provide the desired opening in the soil and at the same time causes each of the pawls 19 to engage the proper finger or arm 11 so that upon again imparting swinging movement to the upper end portions of the members A and B each of the pawls 19 will rock or turn its plate 9 sufficient to cause the material within the associated hopper to be discharged through an opening 5 and conduit 6 into the ground.

In the present embodiment of our invention the hopper 12 carried by the lever A is adapted for use in connection with fertilizer while the hopper B is adapted for corn or kindred seed so that, by the pawls 19, a simultaneous discharge of the seed and fertilizer is effected.

When it is desired to dispense with the discharge of fertilizer the operating pawl 19 co-acting with the plate 9 carried by the lever or member A is rendered inoperative by swinging upwardly into contact with said pawl 19 a rock arm 21, said arm 21 holding the pawl 19 in a raised position and free of the fingers or arms 10. The rock arm 21 at its pivoted end portion is provided with an upstanding arm 22 having a spring pressed dog or pawl 23 which engages from below a rack 24 secured to the inner face of the member A. Through this instrumentality the arm 21 is effectively maintained in either raised or lowered position as desired and in a manner which readily permits the desired rocking movement of the arm 21.

Each of the plates 9 is held against retrograde rotation by an elongated dog or pawl 25 pivotally supported as at 26 intermediate its ends by arms 27 depending from the partition 16. An end portion of the dog or pawl 25 engages within the openings 11 in a manner whereby the plate 9 is effectively held against return rotation. The working end of the contact or pawl 25 is constantly urged toward the adjacent plate 9 by the expansible member or spring 28.

30 denotes a cut-off lever pivotally supported at 31 intermediate its ends with arms 32 depending from the partition 16. The expansible member or spring 28 hereinbefore referred to also co-acts with an end portion of said cut-off lever 30 whereby an end portion of said lever 30 is constantly urged into contact with the upper face of a plate 9. By this means the seeds or fertilizer carried within an opening 11 will only be an amount which can be received within said opening.

The upper or free end portion of the members or levers A and B are provided with outstanding hand grasps or handles 33 to provide means whereby the device or implement may be properly manipulated. It is preferred, as illustrated, that these hand grasps or handles extend in a direction to overlie the hoppers 12.

Extending from the outer side marginal portion of each of the tables or supports 4 is a flange 4' shown in full lines in Figure 2 but indicated by dotted lines in Figure 1, said flange being adjacent to and outwardly of a pulley 19. This flange serves as a guide for the lever 19 to assure its maintenance in working or applied position.

While we have hereinbefore stated that one of the hoppers may contain grain and the other fertilizer, we do not wish to be understood as limiting ourselves in this respect because either seed or other material, as the requirement of practice may prefer, may be applied within said hoppers.

From the foregoing description it is thought to be obvious that a planting device constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

In a planter, a supporting member carrying a table having a discharge opening, a plate rotatable on the table and having a plurality of openings adapted to be brought successively into registration with the opening in the table, a hopper carried by the support above the rotatable plate, a partition extending partially across the lower portion of the hopper and terminating in a depending wall having an opening beneath which the successive openings in the plate are brought, a pawl pivoted beneath said partition and engaging within the successive openings in the plate for holding the plate against rotation in one direction, means for rotating the plate in the other direction, a cut-off lever beneath the partition pivotally supported therefrom and having its active end located within the last named opening, said pawl and said cut-off lever being both carried by elements depending from the partition and to which they are pivoted intermediate their ends, and an expansion spring engaged between the pawl and the cut-off lever in advance of the pivot of the former and the rear of the pivot of the latter whereby said single spring will operate to urge both the pawl and the lever into engagement with the table.

In testimony whereof we hereunto affix our signatures.

BROWNLOW FIELDS.
VAN BUREN FIELDS.